United States Patent [19]

Morita et al.

[11] 4,298,713
[45] Nov. 3, 1981

[54] PROCESS FOR PREPARING LOW DENSITY ETHYLENE COPOLYMERS

[75] Inventors: Yoshinori Morita; Akinori Toyota; Norio Kashiwa, all of Iwakuni, Japan

[73] Assignee: Mitsui Petrochemical Industries, Ltd., Tokyo, Japan

[21] Appl. No.: 106,736

[22] Filed: Dec. 26, 1979

[30] Foreign Application Priority Data

Dec. 28, 1978 [JP] Japan ................... 53-161203

[51] Int. Cl.$^3$ .................. C08F 2/06; C08F 4/16
[52] U.S. Cl. .................. 525/323; 525/247; 525/268; 525/320; 525/321; 525/322; 525/324; 526/75
[58] Field of Search .......... 525/324, 247, 268, 320, 525/321, 322, 323; 526/75

[56] References Cited

U.S. PATENT DOCUMENTS

| | | | |
|---|---|---|---|
| 4,128,606 | 12/1978 | Furutachi et al. | 525/324 |
| 4,128,607 | 12/1978 | Shiomura et al. | 525/324 |
| 4,149,990 | 4/1979 | Giamnini et al. | 526/125 |

FOREIGN PATENT DOCUMENTS 51-52487 5/1976 Japan .
52-121689 10/1977 Japan .
52-124089 10/1977 Japan .

*Primary Examiner*—William F. Hamrock
*Attorney, Agent, or Firm*—Sherman & Shalloway

[57] ABSTRACT

A process for producing an ethylene copolymer having a density of from 0.900 to 0.945 g/cm$^3$ by copolymerizing in two steps a predominant amount of ethylene with a minor amount of an alpha-olefin containing at least 3 carbon atoms at room temperature to not more than about 100° C. under a pressure of about 1 to about 100 kg/cm$^2$ in the presence of a catalyst composed of (A) a titanium catalyst component supported on a magnesium compound and (B) an organoaluminum compound; characterized in that said copolymerization is carried out in (i) a first step where about 0.01 to about 50 g, per gram of the titanium catalyst component (A), of the alpha-olefin containing at least 3 carbon atoms is polymerized, said catalyst further comprising an organic acid ester (C), and then (ii) a second step where the final product of ethylene copolymer is formed in an amount more than about 100 times the weight of the polymer formed in the first step.

12 Claims, No Drawings

PROCESS FOR PREPARING LOW DENSITY ETHYLENE COPOLYMERS

This invention relates to a process for producing with commercial advantage by an easy operation an ethylene copolymer composed of a predominant amount of ethylene and a minor amount of an alpha-olefin containing at least 3 carbon atoms which has a high bulk density and a low density and is free from fish eyes.

More specifically, this invention relates to a process for producing an ethylene copolymer having a density of from 0.900 to 0.945 g/cm$^3$ by copolymerizing in two steps a predominant amount of ethylene with a minor amount of an alpha-olefin containing at least 3 carbon atoms at room temperature to not more than about 100° C. under a pressure of about 1 to about 100 kg/cm$^2$ in the presence of a catalyst composed of (A) a titanium catalyst component supported on a magnesium compound and (B) an organoaluminum compound; characterized in that said copolymerization is carried out in (i) a first step where about 0.01 to about 50 g, per gram of the titanium catalyst component (A), of the alpha-olefin containing at least 3 carbon atoms is polymerized, said catalyst further comprising an organic acid ester (C), and then (ii) a second step where the final product of ethylene copolymer is formed in an amount more than about 100 times the weight of the polymer formed in the first step.

It is known that copolymerization of ethylene with a minor amount of an alpha-olefin containing at least 3 carbon atoms in the presence of a Ziegler catalyst affords ethylene copolymers having much the same density as high-pressure polyethylene. Generally, it is advantageous to use high-temperature melt polymerization which is carried out at a temperature above the melting point of the copolymer formed using a hydrocarbon solvent, because the polymerization operation of such a method is generally easy. When it is desired to obtain a copolymer having a sufficiently high molecular weight, however, the concentration of the polymer in the solution must be reduced because the viscosity of the polymer solution increases. Accordingly, this causes the defect that the output of the copolymer per unit polymerization vessel is inevitably low.

On the other hand, when the low-density ethylene copolymer is to be obtained by the slurry polymerization which is frequently used in the production of high-density polyethylene, the copolymer is liable to be dissolved in, or swollen with, the polymerization solvent, and the concentration of the slurry cannot be increased because of the increase in the viscosity of the polymer solution, the adhesion of the polymer to the wall of the polymerization vessel, and the reduction of the bulk density of the polymer, and moreover, the operation cannot be performed continuously for a long period of time. Moreover, the quality of the resulting polymer is unsatisfactory because it becomes sticky.

In an attempt to remove the aforesaid defects associated with the production of a low-density ethylene copolymer composed of a predominant amount of ethylene with a minor amount of an alpha-olefin containing at least 3 carbon atoms, some methods for the multi-step copolymerization of ethylene with a minor amount of an alpha-olefin containing at least 3 carbon atoms have been suggested.

For example, Japanese Laid-Open Patent Publication No. 52487/76 (laid-open on May 10, 1976) discloses a process for producing a low-density ethylene copolymer having a high bulk density, which comprises a first step wherein in the presence of a liquid diluent and a catalyst composed of (1) a titanium catalyst component supported on a magnesium compound obtained by copulverizing a titanium compound selected from titanium tetrachloride, titanium trichloride and titanium trichloride compositions, a magnesium halide and an aluminum halide/ether complex, and (2) an organoaluminum compound catalyst component, ethylene is polymerized in an amount of at least 5 g per gram of the titanium catalyst component, the amount of ethylene polymerized being up to 20% of the amount of the final product of ethylene copolymer formed, and subsequently a second step wherein a predominant amount of ethylene is copolymerized with a minor amount of an alpha-olefin containing at least 3 carbon atoms at a temperature of not over 100° C. using a low boiling hydrocarbon having a boiling point of not more than 40° C. as a diluent. In this process, it is essential to polymerize a small amount of ethylene in the first step. The Publication does not at all refer to the use of an organic acid ester. Moreover, in this process, the boiling point of the liquid diluent used in the second step is greatly limited.

Japanese Laid-Open Patent Publication No. 121689/77 (laid-open on Oct. 13, 1977) discloses a process for producing a low-density polyethylene containing a minor amount of an alpha-olefin containing at least 3 carbon atoms having a density of not more than 0.945 g/cm$^3$, which comprises a first step wherein in the presence of a catalyst composed of a titanium catalyst component supported on a magnesium and/or aluminum compound consisting of a magnesium and/or aluminum compound and titanium tetrachloride and an organoaluminum compound, ethylene is polymerized in an amount of 1 to 50 g per gram of the titanium catalyst component, a second step wherein ethylene is copolymerized with an alpha-olefin containing at least 3 carbon atoms so that the proportion of the alpha-olefin is 10 to 80% of the final product of ethylene copolymer formed while in the initial stage it is adjusted to not more than 3% by weight based on the ethylene, and a third step wherein the reaction is completed while the proportion of the alpha-olefin copolymerized is increased to more than that in the second stage and up to 20% by weight based on ethylene, characterized in that the copolymerization is carried out in slurry in a hydrocarbon solvent having a boiling point of not more than 40° C. at a temperature of not more than 100° C. In this process, too, the polymerization of a small amount of ethylene in the first step is essential, and the Publication does not at all describe the use of an organic acid ester. Furthermore, the process of this Publication requires three steps, and therefore, is complicated and disadvantageous in operation. Moreover, the boiling point of the liquid diluent used in the copolymerization is greatly restricted.

Japanese Laid-Open Patent Publication No. 124089/77 (laid open on Oct. 18, 1977) discloses a process, similar to those of the two Publications cited above, for the production of an ethylene copolymer having a density of from 0.925 to 0.950 g/cm$^3$ composed of a predominant amount of ethylene and a minor amount of an alpha-olefin containing at least 3 carbon atoms, which comprises a first step wherein in the presence of a catalyst composed of a titanium or vanadium catalyst component supported on a magnesium compound and an organoaluminum compound catalyst component, ethylene is polymerized in an amount of at least 50 g per gram of the titanium or vanadium catalyst component, the amount of ethylene polymerized being adjusted to not more than 20% based on the final product of ethylene copolymer formed, and subsequently a second step wherein a predominant amount of ethylene is copolymerized with a minor amount of an alpha-olefin containing at least 3 carbon atoms at a temperature of not more than 100° C. using a low boiling hydrocarbon having a boiling point of not more than 40° C. as a diluent. In this process, too, it is essential, as in the process of the Publication No. 52487/76, to polymerize a small amount of ethylene in the first step. The Publication does not at all refer to the use of an organic acid ester. Moreover, the boiling point of the liquid diluent used in the second step is greatly limited. It has been found that because the amount of ethylene polymerized in the first step is too large, a film prepared from the final product of ethylene copolymer formed has undesirable fish eyes.

The present inventors made investigations in order to provide an improved process for the production of a low-density ethylene copolymer, which can remedy the defects associated with these prior techniques. These investigations have led to the discovery that the aforesaid defects can be remedied by the aforesaid process comprising a combination of the specified first and second steps (i) and (ii); that relatively high boiling hydrocarbon solvents such as hexane or heptane conventionally used in the polymerization or copolymerization of olefins can be used in this process; and that by an easy operation, a high-quality low-density ethylene copolymer having a high bulk density and being free from fish eyes can be produced in good yields with commercial advantage.

It is an object of this invention therefore to provide an improved two-step process for the production of a low-density ethylene copolymer, which can achieve the aforesaid advantages.

The above and other objects and advantages of this invention will become more apparent from the following description.

According to the process of this invention, the copolymerization of a predominant amount of ethylene with a minor amount of an alpha-olefin contacting at least 3 carbon atoms is carried out by a two-step process involving the steps (i) and (ii) described hereinabove.

The catalyst used in the process is composed of (A) a titanium catalyst component supported on a magnesium compound and (B) an organoaluminum compound, and also comprises (C) an organic acid ester. The organic acid ester may be supported in the component (A), or form a complex with part of the component (B). The components (A) and (B) may be separately fed into the polymerization vessel at the time of polymerization instead of mixing them prior to introduction into the polymerization vessel.

Numerous methods have been known to produce the component (A). Generally, there are used a method which comprises reacting a titanium compound directly with a magnesium compound such as a magnesium halide, an alkoxymagnesium, an aryloxymagnesium, an alkoxymagnesium halide, magnesium oxide, magnesium hydroxide, hydrotalcite or Grignard compounds, and a method which comprises reacting the aforesaid magnesium compound with an electron donor, an organoaluminum compound, a silicon compound, etc., and reacting the resulting product with the titanium compound. Such methods can also be used in this invention. The reaction of the magnesium compound with the titanium compound to support the latter on the former can be performed by known means, for example by a copulverization method, or by suspending a solid magnesium compound in a liquid titanium compound.

The titanium catalyst component (A) preferably contains about 0.3 to about 12% by weight, particularly about 0.6 to about 10% by weight, of titanium and has a halogen/titanium atomic ratio of from about 4 to about 200, particularly from about 6 to about 100 and a magnesium/titanium atomic ratio of from about 2 to about 100, particularly from about 3 to about 50. Preferably, the component (A) has a specific surface area of at least about 20 m²/g, especially about 50 to about 800 m²/g.

In the present invention, the catalyst comprises an organic acid ester (C). As stated above, component (C) may be included in the titanium catalyst component (A). In this case, the mole ratio of organic acid ester/titanium is preferably from about 0.1 to about 7, especially from about 0.2 to about 6. One example of the production of the component (A) containing the organic acid ester is described in German Laid-Open Patent Publication (DT-OS) No. 2,739,608.

Preferably, the titanium catalyst component (A) has an average particle diameter in the range of about 5 to about 200 microns. The geometric standard deviation $\sigma_g$ of its particle size distribution is not more than about 2.5, preferably not more than about 2.1. The preferred shape of the titanium catalyst component (A) is a sphere, ellipse, flake, etc. Suitable methods for the production of a titanium catalyst component of these properties are described, for example, in DT-OS 2,346,471, DT-OS 2,345,707, DT-OS 2,641,960, DT-OS 2,839,188 and DT-OS 2,735,672. Or it can be obtained by treating a magnesium alkoxyhalide obtained by the reaction of a Grignard compound and a silicic acid ester, with a halogenating agent and/or an organic acid ester, and reacting the product with the titanium compound.

Examples of the titanium compound used in the preparation of the titanium catalyst component (A) include titanium halides such as titanium tetrachloride, titanium tetrabromide and titanium tetraiodide and titanium alkoxyhalides having a $C_1$-$C_8$ alkoxy group, for example, alkoxytitanium trihalides such as Ti(OCH$_3$)Cl$_3$, Ti(OC$_2$H$_5$)Cl$_3$, Ti(O n-C$_4$H$_9$)Cl$_3$, Ti(OC$_6$H$_{13}$)Cl$_3$, Ti(OC$_8$H$_{17}$)Cl$_3$, Ti(OC$_2$H$_5$)Br$_3$, and Ti(O iso-C$_4$H$_9$)Br$_3$; alkoxytitanium dihalides such as Ti(OCH$_3$)$_2$Cl$_2$, Ti(OC$_2$H$_5$)$_2$Cl$_2$, Ti(O n-C$_4$H$_9$)$_2$Cl$_2$, and Ti(OC$_2$H$_5$)$_2$Br$_2$; trialkoxytitanium monohalides such as Ti(OCH$_3$)$_3$Cl, Ti(OC$_2$H$_5$)$_3$Cl, Ti(O n-C$_4$H$_9$)$_3$Cl and Ti(OC$_2$H$_5$)$_3$Br. Titanium tetrahalides such as titanium tetrachloride are especially preferred.

An example of the organoaluminum compound (B), another constituent element of the catalyst used in the process of this invention, is an organoaluminum compound having at least one Al-carbon bond in the molecule. Examples of such an organoaluminum compound are given below.

(1) Organoaluminum compounds of the general formula

wherein R$^1$ and R$^2$, independently from each other, represent a group selected from the class consisting of $C_1$–$C_{15}$, preferably $C_1$–$C_4$, hydrocarbon groups, X represents a halogen atom, such as chloro, bromo or iodo, and m is a number in the range of $0 < m \leq 3$, n is a number in the range of $0 \leq n < 3$, p is a number in the range of $0 \leq p < 3$, q is a number in the range of $0 \leq q < 3$, and $m+n+p+q=3$.

(2) Complex compounds containing Al and a metal of group I of the periodic table, expressed by the following general formula $$M^1AlR^1_4$$

wherein $R^1$ is as defined in (i) above, and $M^1$ represents Li, Na or K.

Examples of the organoaluminum compound (1) are those of the general formula $R_m^1Al(OR^2)_{3-m}$ in which $R^1$ and $R^2$ are as defined above, and m is preferably a number in the range of $1.5 \leq m \leq 3$; $R_m^1AlX_{3-m}$ in which $R^1$ is as defined above, X represents a halogen atom, and m is preferably $0 < m < 3$; $R_m^1AlH_{3-m}$ in which $R^1$ is as defined above, and m is preferably $2 \leq m < 3$; and $R_m^1Al(OR^2)_nX_q$ in which $R^1$ and $R^2$ are as defined above, X represents a halogen atom, $0 < m \leq 3$, $0 \leq n < 3$, $0 \leq q < 3$, $m+n+q=3$.

Specific examples of the organoaluminum compounds belonging to (1) are trialkyl aluminums such as triethyl aluminum and tributyl aluminum; trialkenyl aluminums such as triisoprenyl aluminum; partially alkoxylated alkyl aluminums, for example, dialkyl aluminum alkoxides such as diethyl aluminum ethoxide and dibutyl aluminum butoxide; alkyl aluminum sesquialkoxides such as ethyl aluminum sesquiethoxide and butyl aluminum sesquibutoxide; compounds having an average composition expressed by $R_{2.5}^1Al(OR^2)_{0.5}$; partially halogenated alkyl aluminums, for example, dialkyl aluminum halides such as diethyl aluminum chloride, dibutyl aluminum chloride and diethyl aluminum bromide; alkyl aluminum sesquihalides such as ethyl aluminum sesquichloride, butyl aluminum sesquichloride and ethyl aluminum sesquibromide; alkyl aluminum dihalides such as ethyl aluminum dichloride, propyl aluminum dichloride and butyl aluminum dibromide; partially hydrogenated alkyl aluminums, for example, dialkyl aluminum hydrides such as diethyl aluminum hydride and dibutyl aluminum hydride, alkyl aluminum dihydrides such as ethyl aluminum dihydride and propyl aluminum dihydride; and partially alcoholated and halogenated alkyl aluminums, for example, alkyl aluminum alkoxyhalides such as ethyl aluminum ethoxychloride, butyl aluminum butoxychloride and ethyl aluminum ethoxybromide.

There can also be used organoaluminum compounds in which two or more aluminum atoms are bonded through an oxygen or nitrogen atom, as aluminum compounds similar to those of formula (1). Specific examples are $(C_2H_5)_2$-AlOAl$(C_2H_5)_2$, $(C_4H_9)_2$AlOAl$(C_4H_9)_2$ and

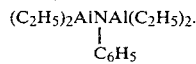

Examples of the component (B) belonging to (2) above are LiAl$(C_2H_5)_4$ and LiAL$(C_7H_{15})_4$.

Of these organoaluminum compounds (B), those belonging to (1) above are preferred, and trialkylaluminums and/or alkyl aluminum halides are especially preferred.

The catalyst utilized in the present invention further includes an organic acid ester (C). The organic acid ester includes, for example, $C_2$–$C_{20}$ aliphatic carboxylic acid esters, $C_6$–$C_{20}$ alicyclic carboxylic acid esters, $C_7$–$C_{20}$ aromatic carboxylic acid esters, $C_5$–$C_{10}$ lactones, and $C_3$–$C_8$ carbonic acid esters.

Specific examples of the organic acid ester (C) include aliphatic carboxylic acid esters such as methyl acetate, butyl acetate, vinyl acetate, ethyl propionate, isopropyl butyrate, cyclohexyl acetate, phenyl acetate, benzyl acetate, methyl chloroacetate, methyl methacrylate, methyl laurate, and methyl stearate; alicyclic carboxylic acid esters such as methyl cyclohexanecarboxylate; aromatic carboxylic acid esters such as methyl benzoate, ethyl benzoate, isopropyl benzoate, n-butyl benzoate, vinyl benzoate, cyclohexyl benzoate, phenyl benzoate, methyl toluate, ethyl toluate, methyl anisate, ethyl anisate, dimethyl phthalate and methyl chlorobenzoate; lactones such as gamma-butyrolactone, delta-valerolactone, coumarine and phthalide; and carbonic acid esters such as ethylene carbonate.

According to the process of this invention, the first step (i) pretreatment (or the pre-copolymerization step) and the second step (ii) copolymerization are carried out in the presence of the catalyst described above, preferably in an inert hydrocarbon solvent. In step (i), a small amount of an alpha-olefin containing at least 3 carbon atoms is polymerized. In this step, ethylene in an amount of not more than 10 mole% of ethylene may be copolymerized with the alpha-olefin. The amount of polymerization in the pre-copolymerization step (i) is about 0.01 to about 50 g, preferably about 0.05 to about 20 g, per gram of the titanium catalyst component (A). If this amount exceeds the upper limit described above fish eyes may occur.

Examples of the inert hydrocarbon solvent preferably used in the pre-copolymerization include aliphatic hydrocarbons such as propane, butane, n-pentane, iso-pentane, n-hexane, n-octane, iso-octane, n-decane, n-dodecane and kerosene; alicyclic hydrocarbons such as cyclopentane, methylcyclopentane, cyclohexane and methylcyclohexane; aromatic hydrocarbons such as benzene, toluene and xylene; and halogenated hydrocarbons such as methylene chloride, ethyl chloride, ethylene chloride and chlorobenzene. Of these, aliphatic hydrocarbons, especially those having 4 to 10 carbon atoms, are preferred.

In the pre-copolymerization step (i), it is preferred to use about 0.001 to about 500 millimoles, especially 0.005 to about 200 millimoles, calculated as titanium atom of the titanium catalyst component (A) per liter of the inert hydrocarbon solvent. Preferably, the organoaluminum compound (B) is used in such a proportion that the Al/Ti atomic ratio is from about 0.1 to about 1000, especially from about 0.5 to about 500. The organic acid ester (C) may be supported on the component (A), or may be used as an adduct with a part of the component (B). Also, it may be added in the free state to the polymerization system. In any case, the amount of the organic acid ester to be present is from about 0.1 to about 200 moles, especially from about 0.2 to about 50 moles, per mole of titanium atom.

Suitable alpha-olefins containing at least 3 carbon atoms used in the pre-copolymerization step (i) are those having not more than 18 carbon atoms such as propylene, 1-butene, 1-hexene, 4-methyl-1-pentene, 3-methyl-1-pentene, 1-heptene, 1-octene, 1-decene, 1-dodecene, 1-tetradecene, and 1-octadecene. Those having 3 to 6 carbon atoms are especially preferred. These alpha-olefins may be homopolymerized, or copolymersed with each other so long as a crystalline polymer results, or may also be copolymerized with not more than 10 mole% of ethylene as mentioned above.

The polymerization temperature in the first step (i) may be selected according to the type of the alpha-olefin or the hydrocarbon solvent, and may, for example, be about −40° C. to about 80° C. For example, when the alpha-olefin is propylene, the suitable polymerization temperature is about −40° C. to about 70° C. In the case of butene-1, it is about −40° C. to about 40° C.; and in the case of 4-methyl-1-pentene, or 3-methyl-1-pentene, it is about −40° C. to about 70° C. The precopolymerization in step (i) may be carried out in the copresence of hydrogen.

According to the process of this invention, ethylene and an alpha-olefin containing at least 3 carbon atoms are copolymerized in the presence of the catalyst used in the first step (1) of polymerizing the alpha-olefin having at least 3 carbon atoms, thereby to produce an ethylene copolymer having a density of 0.900 to 0.945 g/cm$^3$.

Suitable alpha-olefins having at least 3 carbon atoms used in the second step (ii) include those having not more than 18 carbon atoms such as propylene, 1-butene, 1-pentene, 1-hexene, 4-methyl-1-pentene, 1-heptene, 1-octene, 1-decene, 1-dodecene, 1-tetradecene, and 1-octadecene.

The copolymerization step (ii) is carried out at a temperature of not more than 100° C., preferably from about 30° to about 85° C., under such conditions that the resulting copolymer is not melted. The copolymerization in step (ii) is carried out so that the amount of the final copolymer obtained is at least about 100, preferably at least 500, more preferably at least 1000, times the amount of the polymer formed in the first step (i). The copolymerization in step (ii) may be carried out in slurry, or in the gaseous phase in the absence of a liquid hydrocarbon. The present invention exhibits a marked effect when it is applied to slurry polymerization. As the hydrocarbon medium, inert hydrocarbons of the types exemplified above with regard to step (i) or alpha-olefins are used. Aliphatic hydrocarbons, especially those having 3 to 12 carbon atoms, are preferred. The great advantage of this invention is that good results can be obtained even when a solvent having a boiling point higher than 40° C. is used.

The concentration of the catalyst in the slurry polymerization is preferably such that the amount of the titanium catalyst component (A) is about 0.001 to about 1 millimole, preferably about 0.003 to about 0.1 millimole, calculated as titanium atom, per liter of the liquid phase, and the amount of the organoaluminum compound (B) is such that the Al/titanium atomic ratio is from about 2 to about 2000, preferably from about 10 to about 1000.

To achieve a density within the aforesaid range, the amount of the alpha-olefin in the copolymer is limited, for example, to about 0.2 to about 30% by weight, especially about 0.3 to about 25% by weight, although it differs depending upon the type of the catalyst or the type of the alpha-olefin. For this purpose, the rate of feed of the alpha-olefin is properly selected depending upon the polymerization conditions such as the polymerization temperature and pressure. The polymerization pressure is generally from about 1 to about 100 kg/cm$^2$. To control the molecular weight of the copolymer, a molecular weight controlling agent such as hydrogen may be fed into the polymerization system. Various electron donors, and silicon, boron or tin compounds may be added to the catalyst system in order to increase the catalyst activity or regulate the molecular weight distribution of the copolymer.

The copolymerization of this invention may be carried out in two or more stages in which different conditions are employed.

The following examples specifically illustrate the present invention.

EXAMPLE 1

Synthesis of catalyst:

In a stream of nitrogen, 1 mole of commercially available metallic magnesium was added to 500 ml of dehydrated and purified hexane, and 1.1 moles of tetraethoxysilane was further added. With stirring, the mixture was heated to 65° C. Then, small amounts of methyl iodide and iodine were added dropwise, and 1.2 moles of n-butyl chloride was added dropwise over the course of 2 hours. The mixture was stirred at 70° C. for 7 hours. After the reaction, the reaction mixture was repeatedly washed with hexane. Subsequently, 0.25 mole of ethyl benzoate was added and they were reacted at 60° C. for 1 hour. The supernatant portion was withdrawn, and 10 moles of titanium tetrachloride was added to the remaining solid portion, and they were reacted at 120° C. for 2 hours. The titanium tetrachloride was withdrawn, and then under the same conditions as above, titanium tetrachloride was reacted to support Ti. After the reaction, the solid portion was repeatedly washed with hexane. The resulting solid was analyzed for composition. It was found that the solid contained 29 mg of Ti, 205 mg of Mg, 650 mg of Cl, and 87 mg of ethyl benzoate per gram thereof.

The Ti catalyst component had an average particle diameter of 18.6 microns, a geometric standard deviation $\sigma_g$ of particle size distribution of 1.51, and a specific surface area of 230 m$^2$/g.

Polymerization

The titanium catalyst component obtained above was diluted with dehydrated and purified hexane so that the concentration of the catalyst component was 30 millimoles/liter calculated as titanium atom, and 3 millimoles of triethylaluminum and 1 millimole of methyl toluate were added per millimole of titanium atom. Propylene was then fed at 30° C. under atmospheric pressure, and reacted in an amount of 1.62 g per gram of the solid catalyst, thus pre-treating the catalyst with propylene.

Separately, one liter of dehydrated and purified hexane was put into a 2-liter autoclave. The inside of the autoclave was purged sufficiently with nitrogen. Then 1.5 millimoles of triethyl aluminum and 0.01 millimole, calculated as titanium, of the catalyst pretreated with propylene were added. Then, hydrogen under a pressure of 1 kg/cm$^2$ was fed, and ethylene containing 7.5 mole% of 1-butene was continuously added so that the total pressure inside the reactor reached 5 kg/cm$^2$. Ethylene and 1-butene were thus polymerized at 65° C. for 2 hours to afford 322 g of an ethylene copolymer having a bulk density of 0.46 g/cm$^3$ and a melt index of 1.7 and a density of 0.928 g/cm$^3$. The proportion of the dissolved polymer based on the hexane solvent was 2.9% by weight.

EXAMPLES 2 TO 14

Various runs were conducted using the catalyst prepared by the method of Example 1 in the same way as in Example 1 except that the conditions for pre-treating with the alpha-olefin were changed, the polymerization solvent used in the polymerization of ethylene and the alpha-olefin was changed, or the type of the alpha-olefin was changed, as shown in Tables 1—1 and 1-2. The results obtained are also shown in Table 1-2.

TABLE 1-1

| | Conditions for pre-treatment with α-olefin | | | | | | | |
|---|---|---|---|---|---|---|---|---|
| Example | Concentration of Ti catalyst component (mmoles/l) | Type of organo-aluminum compound | Mole ratio of organo-aluminum compound to Ti catalyst component | Type of α-olefin | Type of the ester added at the time of pre-treatment | Pre-treating temperature (°C.) | Pre-treating pressure | Amount of α-olefin used for pre-treatment (g of polymer/g of catalyst) | Presence of $H_2$ during the pre-treatment |
| 1 | 30 | AlEt₃ | 3 | Propylene | Methyl toluate | 30 | Atmospheric pressure | 1.62 | No |
| 2 | 30 | " | 3 | " | Methyl toluate | −10 | Atmospheric pressure | 1.35 | " |
| 3 | 100 | " | 3 | " | Ethyl benzoate | 20 | Atmospheric pressure | 1.55 | " |
| 4 | 1 | " | 3 | " | Methyl toluate | 30 | Atmospheric pressure | 1.48 | " |
| 5 | 0.01 | " | 100 | " | Methyl toluate | 30 | Atmospheric pressure | 10.3 | " |
| 6 | 30 | " | 1 | " | Methyl toluate | 30 | Atmospheric pressure | 1.08 | " |
| 7 | 30 | " | 3 | " | None | 30 | Atmospheric pressure | 1.63 | " |
| 8 | 30 | " | 3 | 1-Butene | Methyl toluate | 0 | Atmospheric pressure | 3.50 | " |
| 9 | 30 | " | 3 | 4-Methyl-1-pentene | Methyl toluate | 20 | Atmospheric pressure | 2.15 | " |
| 10 | 30 | " | 3 | 3-methyl-1-pentene | Methyl toluate | 0 | Atmospheric pressure | 1.33 | " |
| 11 | 30 | " | 3 | Propylene | Methyl toluate | 20 | Atmospheric pressure | 1.60 | " |
| 12 | 30 | " | 3 | " | Methyl toluate | 20 | Atmospheric pressure | 1.60 | " |
| 13 | 30 | " | 3 | " | Methyl toluate | 20 | Atmospheric pressure | 1.60 | " |
| 14 | 30 | " | 3 | " | Methyl toluate | 20 | Atmospheric pressure | 1.60 | " |

TABLE 1-2

| | | Conditions for polymerizing ethylene and α-olefin | | | | | | |
|---|---|---|---|---|---|---|---|---|
| Example | Type of solvent | Concentration of Ti catalyst concentration (mmole of Ti/liter of solvent) | Type of organo-aluminum compound | Mole ratio of organo-aluminum compound to Ti catalyst component | Partial pressure of H (kg/cm²) | Polymerization pressure (kg.cm²) | Polymerization temperature (°C.) | Type of α-olefin | Proportion of α-olefin fed (Mole %) |
| 1 | Hexane | 0.01 | AlEt₃ | 100 | 1.0 | 4.0 | 65 | 1-Butene | 7.5 |
| 2 | " | 0.01 | " | 100 | 1.0 | 4.0 | 60 | " | 5.5 |
| 3 | " | 0.01 | " | 100 | 1.0 | 4.0 | 60 | " | 6.9 |
| 4 | " | 0.01 | " | 100 | 1.0 | 4.0 | 70 | " | 6.0 |
| 5 | " | 0.01 | " | 100 | 1.0 | 4.0 | 65 | " | 6.1 |
| 6 | Heptane | 0.01 | " | 100 | 1.0 | 4.0 | 65 | " | 6.7 |
| 7 | Hexane | 0.01 | " | 100 | 1.0 | 4.0 | 65 | " | 6.0 |
| 8 | " | 0.01 | " | 100 | 0.8 | 4.0 | 60 | " | 8.2 |
| 9 | " | 0.01 | " | 100 | 0.8 | 4.0 | 60 | " | 8.0 |
| 10 | " | 0.01 | " | 100 | 0.1 | 4.0 | 60 | " | 7.3 |
| 11 | " | 0.01 | " | 100 | 1.0 | 4.0 | 60 | Propylene | 8.5 |
| 12 | " | 0.01 | " | 100 | 1.0 | 4.0 | 60 | 1-Hexene | 7.5 |

TABLE 1-2-continued

| | | | | | | | | |
|---|---|---|---|---|---|---|---|---|
| 13 | " | 0.01 | " | 100 | 1.0 | 4.0 | 60 | 4-Methyl-1-pentene 7.5 |
| 14 | " | 0.01 | " | 100 | 1.0 | 4.0 | 60 | 1-Decene 8.8 |

| | Results of polymerization of ethylene and α-olefin | | | | |
|---|---|---|---|---|---|
| Example | Catalyst activity (g of polymer/ mmole of Ti) | Yield of solid polymer (wt. %) (*) | Bulk density (g/cm³) | Melt index | Density of polymer (g/cm³) |
| 1 | 32200 | 97.6 | 0.46 | 1.7 | 0.928 |
| 2 | 31000 | 99.1 | 0.47 | 2.3 | 0.934 |
| 3 | 33800 | 96.9 | 0.45 | 1.4 | 0.926 |
| 4 | 38900 | 97.1 | 0.46 | 2.3 | 0.930 |
| 5 | 34200 | 97.7 | 0.45 | 1.8 | 0.929 |
| 6 | 28400 | 96.7 | 0.44 | 1.2 | 0.929 |
| 7 | 31700 | 96.1 | 0.43 | 1.4 | 0.930 |
| 8 | 34600 | 95.6 | 0.41 | 0.91 | 0.924 |
| 9 | 33100 | 95.3 | 0.42 | 0.86 | 0.925 |
| 10 | 29800 | 95.9 | 0.44 | 1.2 | 0.928 |
| 11 | 30400 | 95.8 | 0.47 | 1.6 | 0.927 |
| 12 | 31400 | 95.3 | 0.46 | 1.4 | 0.930 |
| 13 | 29900 | 95.9 | 0.45 | 1.1 | 0.930 |
| 14 | 26400 | 96.1 | 0.46 | 0.9 | 0.933 |

(*): Proportion of the solid polymer based on the entire polymer formed (solid polymer + solvent-soluble polymer)

EXAMPLES 15 TO 19

Synthesis of catalyst:

Catalysts were synthesized in the same way as in Example 1 except that various esters were used instead of the ethyl benzoate, and were pre-treated with propylene in the same way as in Example 1. Then, under the same polymerization conditions as in Example 1, ethylene and 1-butene were copolymerized. The results obtained are shown in Table 2.

225 m²/g of solid, an average particle diameter of 16.6 microns and a geometric standard deviation of particle size distribution of 1.69.

Polymerization:

The titanium catalyst component obtained as above was diluted with dehydrated and purified hexane so that the concentration of the catalyst component reached 30 millimoles/liter calculated as titanium atom. Then, 3 millimoles of triethyl aluminum and 1 millimole of

TABLE 2

| | | Characteristics of the catalyst | | | | Results of polymerization of ethylene and 1-butene | | | | |
|---|---|---|---|---|---|---|---|---|---|---|
| Example | Type of the ester used in the synthesis of the catalyst | Average particle diameter of the catalyst (microns) | Geometric standard deviation of the distribution of the particle size of the catalyst σ_g | Specific surface area of the catalyst (m²/g) | Amount of Ti supported (mg/g of solid) | Catalyst activity (g of polymer/ mmole of Ti) | Yield of solid polymer (wt. %) | Bulk density (g/cm³) | Melt index | Density of polymer (g/cm) |
| 15 | Ethyl toluate | 18.8 | 1.48 | 235 | 25 | 33200 | 98.0 | 0.48 | 1.1 | 0.929 |
| 16 | n-Butyl benzoate | 19.2 | 1.52 | 250 | 27 | 29600 | 97.1 | 0.47 | 1.9 | 0.926 |
| 17 | Ethyl anisate | 17.5 | 1.49 | 213 | 28 | 24400 | 96.4 | 0.46 | 2.0 | 0.929 |
| 18 | Ethyl butyrate | 20.3 | 1.60 | 197 | 23 | 21500 | 97.1 | 0.41 | 0.85 | 0.930 |
| 19 | Ethyl cyclohexane carboxylate | 19.1 | 1.55 | 206 | 24 | 19800 | 96.6 | 0.41 | 1.3 | 0.933 |

EXAMPLE 20

Synthesis of a catalyst:

In a stream of nitrogen, 2 moles of commercially available anhydrous magnesium chloride was suspended in 4 liters of dehydrated and purified hexane, and with stirring, 12 moles of ethanol was added dropwise over the course of 2 hours. The reaction was performed at 70° C. for 1 hour. Then, 5.85 moles of diethyl aluminum chloride was added dropwise at room temperature, and stirred for 2 hours. Subsequently, 3 moles of titanium tetrachloride was added dropwise, and the reaction was performed at room temperature for 2 hours. After the reaction, the resulting solid portion was repeatedly washed with hexane. It was found that the resulting solid contained 63 mg of Ti, 590 mg of Cl, 185 mg of Mg and 155 mg of the OEt group per gram thereof. The solid catalyst had a specific surface area of methyl p-toluate were added per millimole of titanium atom. Subsequently, propylene was fed at 20° C. under atmospheric pressure, and 1.29 g of propylene was reacted per gram of the solid catalyst to pre-treat the catalyst.

Separately, one liter of dehydrated and purified hexane was put into a 2-liter autoclave. The inside of the autoclave was sufficiently purged with nitrogen, and 1.0 millimole of triethyl aluminum and 0.01 millimole, calculated as titanium atom, of the above catalyst pretreated with propylene were added. Subsequently, hydrogen under 1 kg/cm² was charged, and ethylene containing 6.3 mole% of 1-butene was continuously added so that the total pressure in the autoclave reached 4 kg/cm². Thus, ethylene and 1-butene were copolymerized at 65° C. for 2 hours to afford 255 g of an ethylene copolymer having a bulk density of 0.39 g/cm³ and a melt index of 1.3 and a density of 0.932 g/cm³. The proportion of the dissolved polymer based on the hexane solvent was 3.0% by weight.

EXAMPLE 21

Synthesis of a catalyst:

Two kilograms of commercially available magnesium hydroxide having a specific surface area was suspended in 11 liters of water, and the suspension was stirred for 1 hour at a rotating speed of 5000 rpm using a homomixer having a 20-liter turbine stator. Subsequently, the resulting aqueous slurry of magnesium hydroxide was heated to 80° C. with stirring, and sprayed with a concurrently flowing hot air at 200° C. using a spray drier having two fluid nozzles with a nozzle diameter of 0.254 mm, to obtain spherical particles of magnesium hydroxide. Then, the product was screened to obtain particles having a size of 20 to 63 microns. The treated magnesium hydroxide was spherical and had a specific surface area of 86 m²/g.

Thirty grams of the resulting spherical magnesium hydroxide was added to 400 ml of titanium tetrachloride and reacted for 2 hours at 135° C. After the reaction, titanium tetrachloride was withdrawn. The solid portion was repeatedly washed with hexane. The resulting solid was analyzed for composition. It was found that the solid contained 19 mg of Ti, 360 mg of Mg and 290 mg of Cl per gram thereof.

Thirty grams of the solid obtained as above was put into a three-necked flask fully purged with nitrogen, and 150 ml of kerosene was added. Ethyl benzoate was added dropwise in an amount of 4 moles (47.6 millimoles) per mole of the supported Ti at a reaction temperature of 30° C., and the mixture was stirred at 30° C. for 1 hour. Then, diethyl aluminum chloride was added dropwise in an amount of ½ mole per mole of ethyl benzoate at 30° C., and after the addition, the mixture was stirred at 30° C. for 1 hour. The kerosene solvent was then removed by decantation. The resulting solid was washed twice with 150 ml of kerosene, and 150 ml of titanium tetrachloride was added. They were repeated at 130° C. for 2 hours. The reaction mixture was repeatedly washed with hexane. The solid was analyzed for composition, was found to contain 20 mg of Ti, 310 mg of Cl, 330 mg of Mg and 38 mg of ethyl benzoate. The resulting catalyst had an average particle diameter of 37 microns, a geometric standard deviation of particle size distribution of 1.40, and a specific surface area of 90 m²/g.

Polymerization:

The titanium catalyst component obtained as above was diluted with dehydrated and purified hexane so that the concentration of the catalyst component reached 20 millimoles/liter. Then, 3 millimoles of triethyl aluminum and 1 millimole of methyl p-toluate were added per millimole of titanium atom. Subsequently, propylene was fed at 10° C. under atmospheric pressure, and propylene was reacted in an amount of 1.40 g per gram of the solid catalyst. The catalyst was pre-treated with propylene.

Separately, the inside of a 2-liter autoclave was purged fully with nitrogen, and 2.0 millimoles of triethyl aluminum, and 0.02 millimole calculated as titanium atom of the pre-treated catalyst were added. Subsequently, hydrogen under 1.5 kg/cm² was charged, and ethylene containing 7.5 mole% of 1-butene was added continuously so that the total pressure in the reactor reached 6 kg/cm².G. Thus, ethylene and 1-butene were copolymerized at 60° C. for 2 hours to afford 331 g of a copolymer having a bulk density of 0.40 g/cm² and a melt index of 0.95 and a density of 0.929 g/cm³. The proportion of the polymer dissolved in the hexane solvent was 5.1% by weight.

EXAMPLE 22

Synthesis of a catalyst:

Commercially available anhydrous magnesium chloride (20 g) and 6.0 ml of ethyl benzoate were charged into a stainless steel vessel having a capacity of 800 ml and an inside diameter of 100 mm and containing 100 stainless steel (SUS-302) balls having a diameter of 15 mm in an atmosphere of nitrogen, and copulverized for 50 hours by a vibratory mill device having a power of 7 G. The solid treated product obtained was suspended in titanium tetrachloride, and reacted at 100° C. for 2 hours. The solid portion was separated by filtration, and repeatedly washed with hexane. The resulting solid catalyst component was analyzed for composition, and found to contain 21 mg of Ti, 210 mg of Mg, 670 mg of Cl and 88 mg of ethyl benzoate. The titanium catalyst component had an average particle diameter of 17.8 microns, a geometric standard deviation of particle size distribution of 2.24, and a specific surface area of 185 m²/g.

Polymerization:

The same pre-treatment as in Example 1 was performed to polymerize 1.7 g of propylene per gram of the catalyst. Subsequently, ethylene and 1-butene were copolymerized in the same way as in Example 21 to afford 244 g of an ethylene copolymer having a bulk density of 0.35 g/cm³ and a melt index of 1.1. The ethylene copolymer had a density of 0.931 g/cm³. The proportion of the dissolved polymer based on the hexane solvent was 3.9% by weight.

COMPARATIVE EXAMPLE 1

Synthesis of a catalyst:

Commercially available anhydrous magnesium chloride (20 g) was charged into a stainless steel vessel having a capacity of 800 ml and a diameter of 100 mm and containing 100 stainless steel (SUS-302) balls each having a diameter of 15 mm in an atmosphere of nitrogen, and pulverized for 50 hours by a vibratory mill device having a power of 7 G. The resulting solid treated product was suspended in titanium tetrachloride, and reacted at 120° C. for 2 hours. The solid portion was separated by filtration, and washed repeatedly with hexane. The resulting solid catalyst component was analyzed for composition, and it was found that the solid contained 10 mg of Ti, 235 mg of Mg, and 730 mg of Cl per gram thereof. The resulting titanium catalyst component had an average particle diameter of 12.2 microns, a geometric standard deviation of particle size distribution of 2.31, and a specific surface area of 55 m²/g.

Polymerization:

In the same way as in Example 1, the catalyst was pre-treated with propylene in an amount of 1.43 g per gram of the catalyst. At this time, an electron donor such as methyl p-toluate was absent in the reaction system. Ethylene and 1-butene were copolymerized under the same conditions as in Example 1 using the pre-treated catalyst. There was obtained 115 g of an ethylene copolymer having a bulk density of 0.22 g/cm³ and a melt index of 1.9. The resulting copolymer had a density of 0.941 g/cm³. The proportion of the dissolved polymer based on the hexane solvent was 10.6% by weight. Thus, the bulk density and the yield of the polymer were very poor.

COMPARATIVE EXAMPLE 2

In the method of Example 1, titanium tetrachloride was reacted without reacting ethyl benzoate in the synthesis of the titanium catalyst component. After the reaction, the solid was analyzed for composition, and found to contain 59 mg of Ti, 210 mg of Mg and 690 Mg of Cl per gram thereof.

The resulting titanium catalyst component was pretreated with propylene in an amount of 1.58 g per gram of the solid catalyst. At this time, methyl p-toluate was not added.

Separately, ethylene and 1-butene were copolymerized under the same conditions as in Example 1 in a 2-liter autoclave using the resulting titanium catalyst component. There was obtained 267 g of an ethylene copolymer having a bulk density of 0.32 g/cm³ and a melt index of 1.8. The resulting copolymer had a density of 0.936 g/cm³. The proportion of the dissolved polymer based on the hexane solvent was 7.3% by weight.

What we claim is:

1. A two-step process for producing an ethylene copolymer having a density of from 0.900 g/cm³ to 0.945 g/cm³ and containing a predominant amount of ethylene and a minor amount of an alpha-olefin containing at least 3 carbon atoms, said process comprising:
   (i) pretreating a catalyst composed of
      (A) a halogen-containing titanium catalyst component supported on a magnesium compound;
      (B) an organoaluminum compound; and
      (C) an organic acid ester;
   by polymerizing an alpha-olefin containing at least 3 carbon atoms in the presence of said catalyst to form from about 0.01 to about 50 grams, per gram of the titanium catalyst component (A) of a crystalline poly(alpha-olefin); and
   (ii) copolymerizing a predominant amount of ethylene with a minor amount of an alpha-olefin containing at least 3 carbon atoms at a temperature in the range of room temperature to about 100° C. under a pressure of from about 1 kg/cm² to about 100 kg/cm² in the presence of said pretreated catalyst from step (i) until at least more than 100 times the weight of the crystalline poly(alpha-olefin) formed in step (i) of said ethylene copolymer is formed.

2. The process of claim 1 wherein in the titanium catalyst component (A), the atomic ratio of halogen to titanium is from about 4 to about 200, and the atomic ratio of magnesium to titanium is from about 2 to about 100.

3. The process of claim 1 wherein said organoaluminum compound (B) is selected from the group consisting of
   (1) compounds of the formula

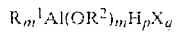

wherein R¹ and R², independently from each other, represent a $C_1$–$C_5$ hydrocarbon group, X represents a halogen atom, m is a number in the range of $0 < m \leq 3$, n is a number in the range of $0 \leq n < 3$, p is a number in the range of $0 \leq p < 3$, q is a number in the range of $0 \leq q < 3$, and $m+n+p+q=3$, and
   (2) complex compounds containing Al and a metal of group I of the periodic table expressed by the following formula

wherein R¹ is the same as defined above, and M¹ represents Li, Na or K.

4. The process of claim 1 wherein said organic acid ester (C) is selected from the group consisting of $C_2$–$C_{20}$ aliphatic carboxylic acid esters, $C_6$–$C_{20}$ alicyclic carboxylic acid esters, $C_7$–$C_{20}$ aromatic carboxylic acid esters, $C_5$–$C_{10}$ lactones and $C_3$–$C_8$ carbonic acid esters.

5. The process of claim 1 wherein said first step (i) is carried out in an inert hydrocarbon solvent using the titanium catalyst component (A) in an amount of about 0.005 to about 200 millimoles liter of solvent calculated as Ti atom, the organoaluminum compound (B) in an amount such that the atomic ratio of Al to Ti is from about 0.1 to about 1000, and the organic acid ester (C) in an amount of about 0.1 to about 200 moles per mole of titanium atom.

6. The process of claim 1 wherein said second step (ii) is carried out using the titanium catalyst component
   (A) in an amount of about 0.001 to about 1 millimole calculated as titanium atom, the organoaluminum compound
   (B) in such an amount that the atomic ratio of Al to Ti is from about 2 to about 2000, and the organic acid ester
   (C) in an amount of about 0.1 to about 200 moles per mole of titanium atom, all per liter of the liquid phase of the reaction system.

7. The process of claim 1 or claim 5 wherein in the pretreatment step (i), the reaction temperature ranges from about −40° C. to about 80° C., and said alpha-olefin contains from 3 to 6 carbon atoms, and the amount of the crystalline poly(alpha-olefin) formed is in the range of from about 0.05 to about 20 grams, per gram of the titanium catalyst component (A).

8. The process of claim 1 or claim 6 wherein said second step (ii) copolymerization is carried out so that the amount of the ethylene copolymer is at least 500 times the amount of the crystalline poly(alpha-olefin) formed in step (i).

9. The process of claim 1 or claim 6 wherein said second step (ii) copolymerization is carried out so that the amount of the ethylene copolymer is at least 1000 times the amount of the crystalline poly(alpha-olefin) formed in step (i).

10. The process of claim 1 wherein in step (ii), ethylene is copolymerized with an alpha-olefin selected from the group consisting of propylene, 1-butene, 1-pentene, 1-hexene, 4-methyl-1-pentene, 1-heptene, 1-octene, 1-decene, 1-dodecene, 1-tetradecene and 1-octadecene.

11. The process of claim 1 wherein the alpha-olefin used in step (i) is propylene and the alpha-olefin used in step (ii) is 1-butene, and wherein the amount of 1-butene in said ethylene copolymer ranges from about 0.2 to about 30% by weight.

12. The process according to claim 1 which comprises
    (i) pretreating a catalyst composed of (A) a halogen-containing titanium catalyst component supported on a magnesium compound, and containing from about 0.6 to about 10% by weight of titanium, a halogen/titanium atomic ratio of from about 6 to about 100, and magnesium/titanium atomic ratio of from about 3 to about 50;
(B) an organoaluminum compound selected from the group consisting of
  (1) compounds of the formula $$R_m^1 Al(OR^2)_n H_p X_q$$

wherein $R^1$ and $R^2$, independently from each other, represent a $C_1$-$C_5$ hydrocarbon group, X represents a halogen atom, m is a number in the range of $0 \leq m < 3$, n is a number in the range of $0 < n \leq 3$, p is a number in the range of $0 \leq p < 3$, q is a number in the range of $0 \leq q < 3$, and $m+n+p+q=3$, and,
  (2) complex compounds containing Al and a metal of group I of the periodic table expressed by the following formula $$M^1 Al R_4^1$$

wherein $R^1$ is the same as defined above, and $M^1$ represents Li, Na or K; and,
(C) an organic acid ester selected from the group consisting of $C_6$-$C_{20}$ aliphatic carboxylic acid esters, $C_6$-$C_{20}$ alicyclic carboxylic acid esters, $C_7$-$C_{20}$ aromatic carboxylic acid esters, $C_7$-$C_{10}$ lactones and $C_3$-$C_8$ carbonic acid esters;

by polymerizing an alpha-olefin containing from 3 to 6 carbon atoms in an inert hydrocarbon solvent in the presence of said catalyst in an amount to provide from about 0.05 to about 200 millimoles of the titanium catalyst component (A), calculated as titanium atom, per liter of solvent, the organoaluminum compound (B) in an amount such that the atomic ratio of Al to Ti is from about 0.1 to about 1000, and from about 0.1 to about 200 moles of the organic acid ester (C) per mole of titanium atom, to form from about 0.05 to about 20 grams, per gram of the titanium catalyst component (A) of a crystalline poly(alpha-olefin); and
  (ii) copolymerizing a predominant amount of ethylene with a minor amount of an alpha-olefin containing from 3 to 18 carbon atoms at a temperature in the range of from about 30° C. to about 85° C. under a pressure of from about 1 kg/cm² to about 100 kg/cm² in a slurry polymerization reaction system in the presence of said pretreated catalyst from step (i) in an amount to provide from about 0.001 to about 1 millimole, calculated as titanium atom, of the titanium catalyst component (A, the organoaluminum compound (B) in such an amount that the atomic ratio of Al to Ti from about 2 to about 2000, and from about 0.1 to about 200 moles of the organic acid ester (C) per mole of titanium atom, all per liter of the liquid phase of the slurry polymerization reaction system, until at least more than 100 times the weight of the crystalline poly(alpha-olefin) formed in step (i) of said ethylene copolymer is formed.

* * * * *

UNITED STATES PATENT AND TRADEMARK OFFICE
CERTIFICATE OF CORRECTION

PATENT NO. : 4,298,713
DATED : November 3, 1981
INVENTOR(S) : Yoshinori MORITA: Akinori TOYOTA and Norio KASHIWA It is certified that error appears in the above—identified patent and that said Letters Patent is hereby corrected as shown below:

Claim 3, line 7 should read "represents a $C_1$-$C_{15}$. . ."

Claim 12, column 17, line 15 should read "represents a $C_1$-$C_{15}$ . . ."

Signed and Sealed this

Nineteenth Day of January 1982

[SEAL]

Attest:

GERALD J. MOSSINGHOFF

*Attesting Officer*   Commissioner of Patents and Trademarks